(12) United States Patent
Kinoshita et al.

(10) Patent No.: US 9,315,220 B2
(45) Date of Patent: Apr. 19, 2016

(54) CAB FOR CONSTRUCTION MACHINE

(71) Applicant: KOBELCO CONSTRUCTION MACHINERY CO., LTD., Hiroshima (JP)

(72) Inventors: Akira Kinoshita, Hiroshima (JP); Keiji Yamamoto, Hiroshima (JP); Masakazu Ozaki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/804,657

(22) Filed: Jul. 21, 2015

(65) Prior Publication Data
US 2016/0031495 A1 Feb. 4, 2016

(30) Foreign Application Priority Data

Aug. 1, 2014 (JP) .................................. 2014-157591

(51) Int. Cl.
*B62D 33/06* (2006.01)
*B62D 21/15* (2006.01)
*B60R 21/13* (2006.01)

(52) U.S. Cl.
CPC ............ *B62D 33/0617* (2013.01); *B60R 21/13* (2013.01); *B62D 21/15* (2013.01)

(58) Field of Classification Search
CPC .... B62D 33/06; B62D 33/0617; B62D 21/15; B62D 21/157; B62D 49/00; B60R 21/13; B60R 2021/0006; B60R 2021/0018; B60R 2021/0074; B60R 2021/0076; B60R 2021/0081; B60R 2021/131; B60R 2021/137

USPC ............................ 296/190.01, 190.03, 190.08
See application file for complete search history.

(56) References Cited

U.S. PATENT DOCUMENTS

| | | | | |
|---|---|---|---|---|
| 6,076,884 A | * | 6/2000 | Osman | B62D 33/0612 296/190.02 |
| 2007/0035160 A1 | * | 2/2007 | Murakami | E02F 9/163 296/190.03 |

(Continued)

FOREIGN PATENT DOCUMENTS

| | | |
|---|---|---|
| EP | 1 666 343 A2 | 6/2006 |
| GB | 2 441 484 A | 3/2008 |

(Continued)

OTHER PUBLICATIONS

Extended European Search Report mailed Dec. 11, 2015 in European Patent Application No. 15178583.9.

*Primary Examiner* — Gregory Blankenship
(74) *Attorney, Agent, or Firm* — Oblon, McClelland, Maier & Neustadt, L.L.P

(57) ABSTRACT

Provided is a cab for construction machine, having an excellent operator protection effect against a lateral load. Provided is a cab disposed on an upper frame of a construction machine, including a pair of rear pillars and a rear panel disposed therebetween. The rear panel includes an outer panel and an inner panel including a plurality of panel portions vertically arranged and a bridge portion partly bridging the panel portions vertically adjacent to each other at a position offset from a lateral center position of the rear panel. The bridge portion forms a low-strength portion having lower strength than that of the panel portions so as to make the low-strength portion include a bending point at which the rear panel is bent when a lateral load acts thereon through an outer rear pillar.

5 Claims, 5 Drawing Sheets

(56) References Cited

U.S. PATENT DOCUMENTS

2009/0127888 A1* 5/2009 Tsukamoto .......... B62D 33/0617
  296/190.03
2015/0298747 A1* 10/2015 Ishibai .................. B62D 33/06
  296/190.03
2015/0298749 A1* 10/2015 Zurinski ............ B62D 33/0617
  296/190.08

FOREIGN PATENT DOCUMENTS

| | | |
|---|---|---|
| JP | 2004-076383 A | 3/2004 |
| JP | 2007-055445 A | 3/2007 |
| JP | 2007-069807 | 3/2007 |
| JP | 2007-069877 A | 3/2007 |
| WO | WO03/029069 A2 | 4/2003 |

* cited by examiner

CAB FOR CONSTRUCTION MACHINE

TECHNICAL FIELD

The present invention relates to a cab for use in a construction machine such as an excavator.

BACKGROUND ART

In a construction machine including a lower travelling body and an upper slewing body slewably mounted on the lower travelling body, a cab is disposed as an operator's compartment of the construction machine on an upper frame that constitutes the upper slewing body.

Regarding this type of construction machine, there is an important challenge of securing safety of an operator staying in the cab in case of turning over of the construction machine. Specifically, turning over of a construction machine causes an external lateral load to act on the cab to deform it. Required is securing a safety space for the operator, especially a space in a rear portion where the operator stays, even though the cab is deformed.

As means for satisfying the above requirement, Japanese Unexamined Patent Publication No. 2007-69807 discloses a cab for use in a construction machine, the cab including a pair of right and left rear pillars standing in a rear portion of the cab and a rear panel disposed between the pair of rear pillars, the rear panel being given high rigidity. Specifically, the rear panel has a multi-layer structure including a plurality of panel portions joined to each other, at least one of the plurality of panel portions having a reinforcement rib.

Thus thickening rear panel, however, involves increases in material cost and production cost of the rear panel. In addition, the high rigidity given to the rear panel, that is, a high deformation resistance, increases a load that acts on the rear pillar, on the contrary to the expectation, which may bring the rear pillar into breakage. The related art, thus, cannot remarkably improve protection for the operator.

SUMMARY OF INVENTION

An object of the present invention is to provide a cab for use in a construction machine, the cab being capable of performing an excellent protection for an operator against a lateral load.

Provided is a cab for use in a construction machine including a lower travelling body and an upper slewing body slewably mounted on the lower travelling body, the upper slewing body including an upper frame, the cab being disposed on the upper frame. The cab includes a pair of rear pillars standing in a rear portion of the cab and laterally spaced, and a rear panel disposed between the pair of rear pillars. The rear panel includes an outer panel and an inner panel disposed on an inner side of the outer panel and joined to the outer panel. The inner panel includes a plurality of panel portions vertically arranged, each of the panel portions extending laterally, and a bridge portion partly bridging the panel portions vertically adjacent to each other, at a position offset outward and widthwise of the upper frame from a lateral center position of the rear panel. The bridge portion forms a low-strength portion of the inner panel, the low-strength portion having a lower strength than a strength of the panel portions against a lateral load applied to the rear panel through an outer rear pillar of the pair of rear pillars from outer side widthwise of the upper frame upon turning over of the construction machine, so as to make the low-strength portion include a bending point at which the rear panel is bent by the lateral load.

DESCRIPTION OF EMBODIMENT

An embodiment of the present invention will be described based on an excavator according to a compared example shown in FIG. 6 to FIG. 9.

Figure 6:
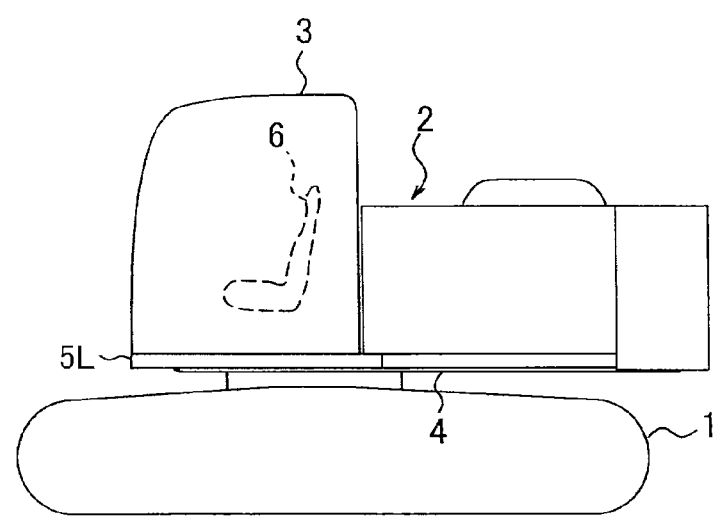
FIG. 6 is a side view showing an excavator according to either of the embodiment and a compared example.
Figure 7:
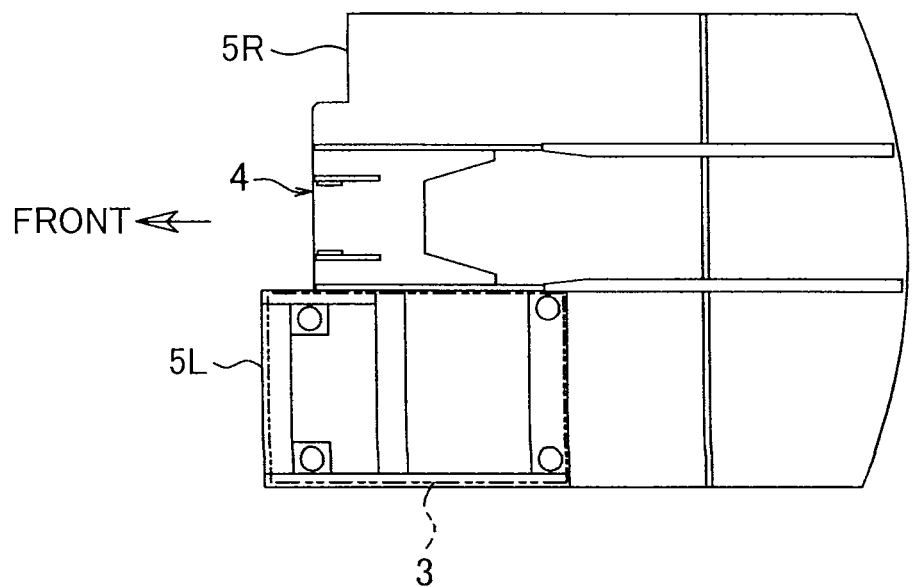
FIG. 7 is a plan view showing an upper frame of the excavator according to the compared example.

As shown in FIG. 6, the excavator according to the compared example includes a crawler-type lower travelling body 1, an upper slewing body 2 slewably mounted on the lower travelling body 1, and a not-graphically-shown work attachment attached to the upper slewing body 2. The upper stewing body 2 includes an upper frame 4 as a base, on which a cab 3 as an operator's compartment is disposed on the upper frame 4.

The upper frame 4 includes a left side deck 5L which is a left side portion and a right side deck 5R which is a right side portion. The cab 3 is mounted on one of the right and left side portions of the upper frame 4, for example, on the left side deck 5L as the left side portion in FIG. 6 and FIG. 7, and disposed in a front portion thereof. In the following description, "front and rear direction", which is a longitudinal direction, and "right and left direction", which is a lateral direction, are defined based on the position of the cab 3.

Figure 8:
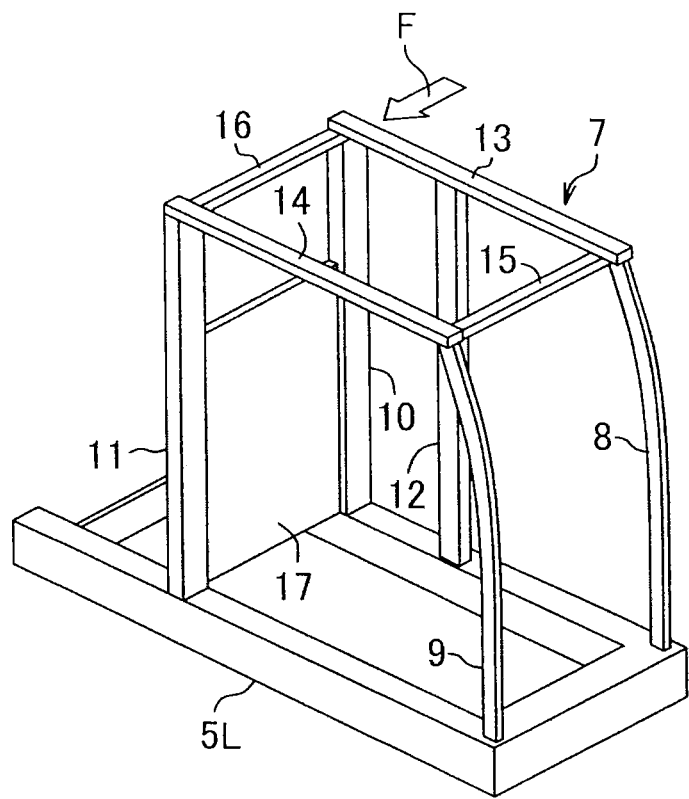
FIG. 8 is a perspective view showing a cab frame according to the compared example.
Figure 9:
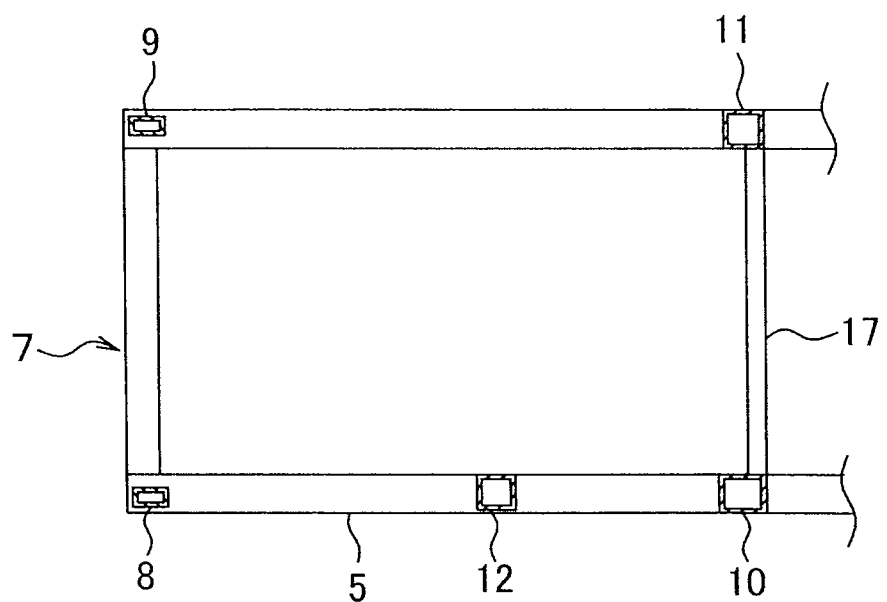
FIG. 9 is a horizontally sectional view showing the cab frame according to the compared example.

The cab 3 includes an operation seat 6 as shown in FIG. 6, a cab frame 7 surrounding the operation seat 6 as shown in FIG. 8 and FIG. 9, and a plurality of armoring members mounted on the cab frame 7. The plurality of armoring members include a plurality of panel portions and a plurality of window glasses forming not-graphically-shown front, rear, left, and right windows, respectively.

The cab frame 7 includes a pair of left and right front pillars 8 and 9 standing in a front portion of the cab 3, a pair of left and right rear pillars 10 and 11 standing in a rear portion of the cab 3, a center pillar 12 standing in a longitudinally middle portion in a left portion of the cab 3, and a plurality of roof members bridging respective upper ends of the pillars, namely, a left roof member 13, a right roof member 14, a front roof member 15, and a rear roof member 16.

Besides, the cab frame 7 includes a cab lower frame constituting a bottom portion of the cab 3 while not shown in FIG. 8 and FIG. 9. The pillars 8 to 11 stand on the cab lower frame. This structure applies to an embodiment of the present invention as will be described later.

Upon turning over of the excavator, there acts a lateral load F shown in FIG. 8 on the cab 3 from a left side, deforming the cab 3. In order to secure safety of the operator staying in the cab 3, required is securing an operator's space in the cab 3, especially a space in the rear portion where the operator stays, irrespective of the deformation of the cab frame 7 caused by the lateral load F. As means for satisfying this requirement, the compared example adopts providing a rear panel 17 disposed between the rear pillars 10 and 11 with a multi-layer structure including a plurality of panel portions joined to each other to give the rear panel 17 a high rigidity, as disclosed in Japanese Unexamined Patent Publication No. 2007-69807.

This structure, however, makes the rear panel 17 be large and heavy and inevitably involves a largely increased cost for material and production. In addition, the high rigidity in the rear panel 17, that is, a high deformation resistance, causes a large load to act on neighbor members of the rear panel 17. In particular, the left rear pillar 10 on which the lateral load F can directly act is likely to receive excessive load, which may bring the left rear pillar 10 into breakage. Thus, simply giving the rear panel 17 the high rigidity can involve remarkable deformation, on the contrary to the expectation, preventing excellent operator protection effect from being obtained. This problem might be solved by reinforcement of the left rear pillar 10 to enhance the rigidity of the left rear pillar 10, especially of the basal portion thereof which can be a breakage fulcrum, similarly to the rear panel 17; however, this reinforcement involves remarkable increase in the size and the weight of the cab 3 and further the cost.

FIGS. 1 to 5 show a cab 43 according to an embodiment of the present invention, which can solve the foregoing problem. The cab 43 according to the present embodiment is mounted on the excavator which is the same as one according to the foregoing compared example shown in FIG. 6, that is, the excavator including the lower travelling body 1 and the upper slewing body 2. The cab 43 is, specifically, disposed on the left side deck 5L which is a left side portion of the upper frame 4 constituting the upper slewing body 2.

The cab 43 includes a cab frame 18, which is a frame of the cab 43, and a plurality of armoring members mounted on the cab frame 18. The plurality of armoring members include a plurality of panel portions and a plurality of window glasses forming respective front, rear, left, and right windows.

The cab frame 18 includes a plurality of pillars, a plurality of roof members, and a rear panel 28. The plurality of pillars include a pair of left and right front pillars 19 and 20 spaced laterally of the cab 3 and standing in a front portion of the cab 3, a pair of left and right rear pillars 21 and 22 spaced laterally of the cab 3 and standing in a rear portion of the cab 3, and a center pillar 23 standing in a longitudinally middle portion of a laterally left portion of the cab 3. The plurality of roof members bridge respective upper ends of the pillars, including a left roof member 24, a right roof member 25, a front roof member 26, and a rear roof member 27. The rear panel 28 is disposed between the left and right rear pillars 21 and 22.

The rear panel 28 according to the present embodiment has a dual-panel structure including an outer panel 29 and an inner panel 30 disposed at an inner side of an upper inner portion of the outer panel 29. The outer panel 29 has right and left opposite end portions, which are mounted on the left and right rear pillars 21 and 22, respectively, by for example welding. On the rear panel 28 is disposed a rear window W shown in FIG. 2.

Figure 1:
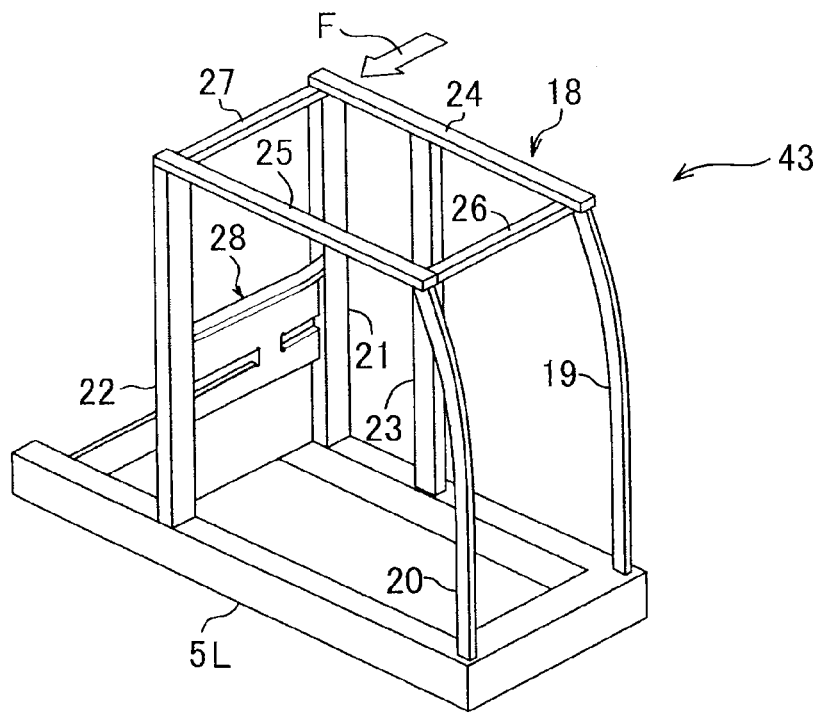
FIG. 1 is a perspective view showing a cab frame constituting a cab according to an embodiment of the present invention.
Figure 2:
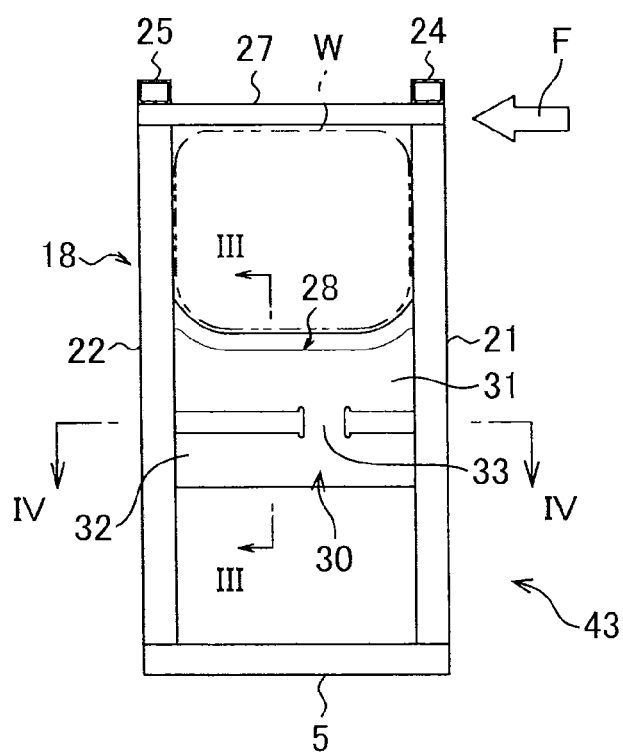
FIG. 2 is a partially sectional front view showing a rear portion of the cab frame.
Figure 3:
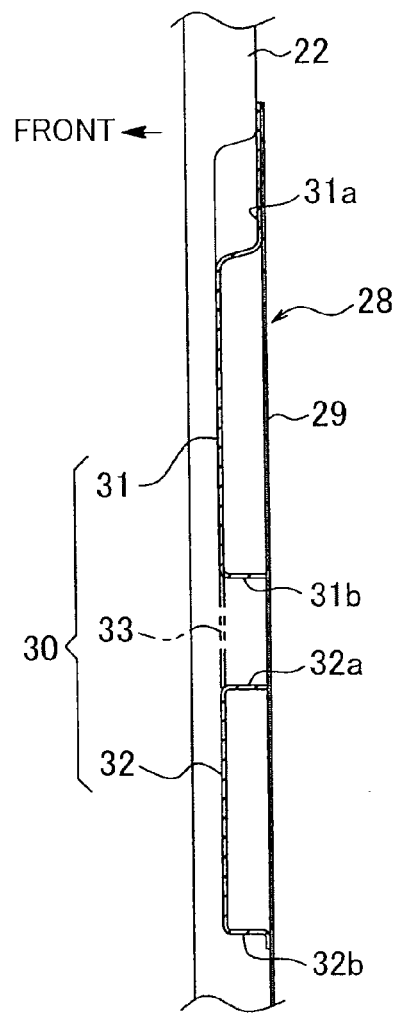
FIG. 3 is a side view enlarging a section taken along line shown in FIG. 2.
Figure 4:
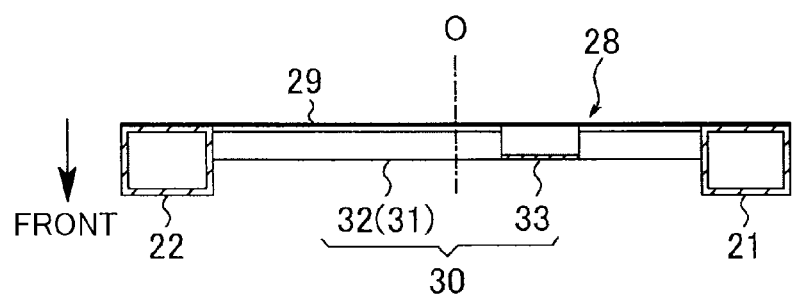
FIG. 4 is a plan view enlarging a section taken along line IV-IV shown in FIG. 2.
Figure 5:
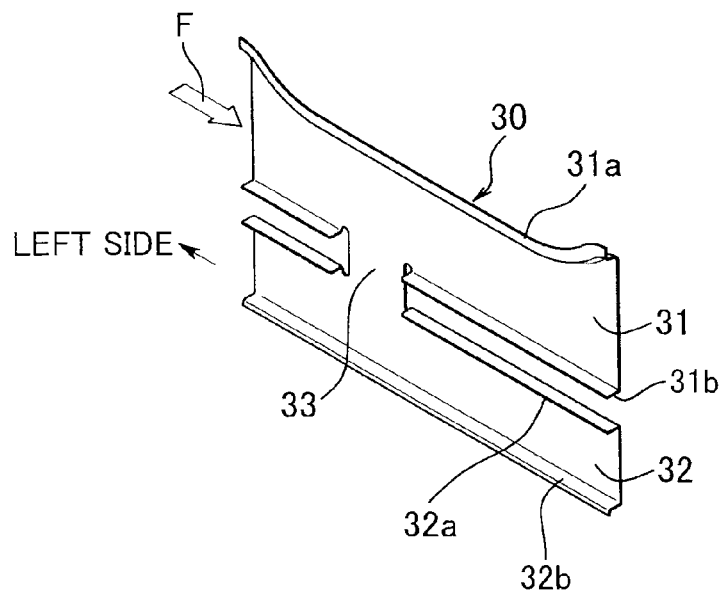
FIG. 5 is a perspective rear view of an inner panel constituting a rear panel of the cab.

FIG. 3 shows a structure of the inner panel 30 of the rear panel 28.

The inner panel 30 includes an upper panel portion 31 and a lower panel portion 32, which extend laterally, and a bridge portion 33. The bridge portion 33 bridges, i.e., interconnects, respective bridged portions of the upper panel portion 31 and the lower panel portion 32 vertically of the rear panel 28 shown in FIG. 4, the respective bridged portions being offset outward of the upper frame 4 from a lateral center 0 of the rear panel 28, that is, according to the present embodiment, the respective bridged portions being offset leftward of the rear panel 28. In other words, the bridge portion 33 partially bridges the upper and lower panel portions 31 and 32 laterally of the rear panel 28, while allowing the upper and lower panel portions 31 and 32 to be vertically separated from each other in the region where the bridge portion 33 is absent.

The upper and lower panel portions 31 and 32 have respective upper reinforcement edge portions 31a and 32a and respective lower reinforcement edge portions 31b and 32b. These reinforcement edge portions are formed by bending respective upper edge portions and lower edge portion of plate members (metal plates) for forming the upper and lower panel portions 31 and 32. The reinforcement edge portions 31a, 32a, 31b, and 32b are secured to an inner surface of the outer panel 29, for example, by welding or the like, thereby forming an upper box structure constituted by the upper panel portion 31 and an upper portion of the outer panel 29 and a lower box structure composed of the lower panel portion 32 and a lower portion of the outer panel 29.

Unlike the upper and lower panel portions 31 and 32, the bridge portion 33 is composed of a flat plate having no reinforcement edge portions. In addition, the bridge portion 33 is not welded to the outer panel 29 but separated from the outer panel 29 longitudinally of the cab 3.

Thus being different from the upper and lower panel portions 31 and 32 in the point of having no box structure and not secured to the outer panel 29, the bridge portion 33 can form a low-strength portion having lower strength than that of other portions of the entire rear panel 28. This makes the rear panel 28 be likely to be deformed in a V-shape in a planer view at a bending point included in the bridge portion 33, which is a low-strength portion and which bridges the upper and lower panel portions 31 and 32, when the excavator turns over to cause the lateral load F shown in FIG. 1 and FIG. 2 to act on the rear panel 28 through the left rear pillar 21. Furthermore, the offset of the low-strength portion outward (leftward) of the upper frame 4 from the lateral center O of the rear panel 28 promotes the rear panel 28 to be deformed at the laterally inner side (right side) of the upper frame 4.

The rear panel 28 thus absorbs the lateral load F to reduce the load applied to the left rear pillar 21 and thus prevent the left rear pillar 21 from being broken, thereby preventing the cab from large deformation to enable effective protection of the operator to be achieved. In addition, in spite of the dual-panel structure including the outer panel 29 and the inner panel 30, the entire panels do not have high rigidity but reversely includes a portion having relatively low strength with respect to the other portions to promote the portion to be deformed, which contributes reduced size and weight of the cab for reducing cost while preventing the entire cab from being largely deformed.

In addition, the low-strength portion is formed, as described above, by steps of (A) providing the upper and lower panel portions 31 and 32 with the respective upper reinforcement edge portions 31a and 32a and the respective lower reinforcement edge portions 31b and 32b while providing the bridge portion 33 with not any reinforcement edge portions but flat plate shape and (B) securing the upper and lower panel portions 31 and 32 to the outer panel 29, for example, by welding or the like while separating the bridge portion 33 from the outer panel 29; thus forming the low-strength portion can be achieved with light, small and simple structure and low cost.

The upper and lower panel portions 31 and 32 and the bridge portion 33 can be integrally formed, for example, by cutting out a single plate and bending it. This allows assembly process to be facilitated and allows assembling accuracy to be improved.

The present invention is not limited to the foregoing embodiment but permitted to include modifications, for example, as follows.

(1) The upper and lower panel portions 31 and 32 and the bridge portion 33 may be formed as individually separated portions. In this case, the inner panel 30 can be manufactured by interconnection of the upper and lower panel portions 31 and 32 and the bridge portion 33 with welding or fasteners or the like.

(2) The shape of the bridge portion is not limited to one extending vertically with a predetermined width such as that of the bridge portion 33. The bridge portion may have a shape with a vertically varying width or a shape extending diagonally or a shape including an intersection portion in X-shape.

(3) The inner panel according to the present invention may include three or more panel portions vertically arranged and a plurality of bridge portions bridging respective pairs of panel portions vertically adjacent to each other. In this case, respective positions of the plurality of bridge portions may differ from each other. For example, the arrangement where respective positions of the bridge portions are shifted from left to right as being close to the bottom can control the deformation of the rear panel 28 so as to shift the bending points from left to right.

As described above, there can be provided a cab for use in a construction machine, the cab being capable of performing an excellent protection for an operator against a lateral load. Provided is a cab for use in a construction machine including a lower travelling body and an upper slewing body slewably mounted on the lower travelling body, the upper slewing body including an upper frame, the cab being disposed on the upper frame. The cab includes a pair of rear pillars standing in a rear portion of the cab and laterally spaced, and a rear panel disposed between the pair of rear pillars. The rear panel includes an outer panel and an inner panel disposed on an inner side of the outer panel and joined to the outer panel. The inner panel includes a plurality of panel portions vertically arranged, each of the panel portions extending laterally, and a bridge portion partly bridging the panel portions vertically adjacent to each other, at a position offset outward and widthwise of the upper frame from a lateral center position of the rear panel. The bridge portion forms a low-strength portion of the inner panel, the low-strength portion having a lower strength than a strength of the panel portions against a lateral load applied to the rear panel through an outer rear pillar of the pair of rear pillars from outer side widthwise of the upper frame upon turning over of the construction machine so as to make the low-strength portion include a bending point at which the rear panel is bent by the lateral load.

This cab can restrain the lateral load acting on the can upon turning over of the construction machine from deforming the cab to thereby protect an operator staying in the cab effectively. Specifically, although the lateral load acts on the rear panel through the outer rear pillar, the deformation of the rear panel occurs unevenly in an inner portion of the upper frame, because the rear panel has the low-strength portion formed by the bridge portion, being likely to be deformed to be bent at a bending point in the low-strength portion, and further the low-strength portion is offset outward of the upper frame from the lateral center of the rear panel. This unevenness of the deformation enables the rear panel to effectively absorb the lateral load and to reduce the load that acts on the outer rear pillar, thereby preventing the rear panel from being broken. The cab is thus prevented from large deformation, achieving effective protection of the operator.

In addition, the rear panel, though having the dual panel structure including the outer panel and the inner panel, is not given high rigidity for the entire rear panel but given the low-strength portion having partial low strength to promote the low-strength portion to be deformed, which allows the rear panel to have reduced size and weight to thereby reduce cost.

Specifically, preferable is that each of the panel portions is formed of a plate member, an upper edge portion and a lower edge portion of the plate member being bent to form respective upper and lower reinforcement edge portions, and that the bridge portion is a plane plate having no bending portion. This structure can provide a large strength difference between a section in which the plurality of rear panels are disposed and a section where the bridge portion is disposed, while having a light weight and small size to reduce cost.

The remarkable strength difference can be provided also by the arrangement where the plurality of panel portions are secured to the outer panel and the bridge portion is independently separated from the outer panel. Furthermore, in the case where the plurality of the panel portions have respective upper reinforcement edge portions and respective lower reinforcement edge portions, the upper and lower reinforcement edge portions may be preferably secured to the outer panel; this can provide more remarkable strength difference.

The plurality of panel members and the bridge portion are preferably formed of a single plate member. This allows assembly process to be facilitated and allows assembly accuracy to be improved, compared with the case where, for example, the plurality of panel portions and the bridge portion are formed as a plurality of individually separated members and assembled together.

This application is based on Japanese Patent application No. 2014-157591 filed in Japan Patent Office on Aug. 1, 2014, the contents of which are hereby incorporated by reference. Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A cab for use in a construction machine including a lower travelling body and an upper slewing body slewably mounted on the lower travelling body, the upper slewing body including an upper frame, the cab being disposed on the upper frame, the cab comprising:

a pair of rear pillars standing in a rear portion of the cab and laterally spaced; and a rear panel disposed between the pair of rear pillars, wherein:

the rear panel includes an outer panel and an inner panel disposed on an inner side of the outer panel and joined to the outer panel;

the inner panel includes a plurality of panel portions vertically arranged, each of the panel portions extending laterally, and a bridge portion partly bridging the panel portions vertically adjacent to each other, at a position offset outward and widthwise of the upper frame from a lateral center position of the rear panel; and the bridge portion forms a low-strength portion of the inner panel, the low-strength portion having a lower strength than a strength of the panel portions against a lateral load applied to the rear panel through an outer rear pillar of the pair of rear pillars from outer side widthwise of the upper frame upon turning over of the construction machine, so as to make the low-strength portion include a bending point at which the rear panel is bent by the lateral load.

2. The cab for use in a construction machine according to claim 1, wherein each of the plurality of panel portions is formed of a plate member, and an upper edge portion and a lower edge portion of the plate member are bent so as to form respective upper and lower reinforcement edge portions while the bridge portion is a plane plate having no bending portion.

3. The cab for use in a construction machine according to claim 1, wherein each of the plurality of panel portions is secured to the outer panel while the bridge portion is independently separated from the outer panel.

4. The cab for use in a construction machine according to claim 2, wherein the upper reinforcement edge portions and the lower reinforcement edge portions of the panel portions are secured to the outer panel, while the bridge portion is independently separated from the outer panel.

5. The cab for use in a construction machine according to claim 1, wherein the plurality of panel portions and the bridge portion are formed of a single plate member.

* * * * *